United States Patent
Dierneder et al.

(10) Patent No.: US 9,869,577 B2
(45) Date of Patent: Jan. 16, 2018

(54) WEIGHING DEVICE FOR A PLOT COMBINE HARVESTER

(71) Applicant: Wintersteiger AG, Ried im Innkreis (AT)

(72) Inventors: Stefan Dierneder, Naarn (AT); Florian Maier, Leonding (AT); Daniel Gadermeir, Pattigham (AT)

(73) Assignee: Wintersteiger AG, Ried im Innkreis (AT)

( * ) Notice: Subject to any disclaimer, the term of this patent is extended or adjusted under 35 U.S.C. 154(b) by 207 days.

(21) Appl. No.: 14/776,331

(22) PCT Filed: Feb. 11, 2014

(86) PCT No.: PCT/AT2014/050039
§ 371 (c)(1),
(2) Date: Sep. 14, 2015

(87) PCT Pub. No.: WO2014/146154
PCT Pub. Date: Sep. 25, 2014

(65) Prior Publication Data
US 2016/0041027 A1    Feb. 11, 2016

(30) Foreign Application Priority Data
Mar. 18, 2013  (AT) ............... A50187/2013

(51) Int. Cl.
*G01G 19/08*  (2006.01)
*G01G 21/06*  (2006.01)
*G01G 21/07*  (2006.01)
*G01G 21/24*  (2006.01)
*A01D 41/127* (2006.01)

(52) U.S. Cl.
CPC ........... *G01G 19/08* (2013.01); *A01D 41/127* (2013.01); *G01G 21/06* (2013.01); *G01G 21/07* (2013.01); *G01G 21/244* (2013.01)

(58) Field of Classification Search
CPC ........ G01G 19/08; G01G 21/06; G01G 21/07; G01G 21/244; A01D 41/127
See application file for complete search history.

(56) References Cited

U.S. PATENT DOCUMENTS 2,990,899 A * 7/1961 De Bella ............... A61G 7/1019
                                                  177/139
4,236,613 A * 12/1980 van der Lely ....... A01B 59/004
                                                  172/261

(Continued)

OTHER PUBLICATIONS

International Search Report of PCT/AT2014/050039, dated May 30, 2014.

*Primary Examiner* — Randy Gibson
(74) *Attorney, Agent, or Firm* — Collard & Roe, P.C.

(57) ABSTRACT

The invention relates to a weighing device for a plot combine harvester, comprising a weighing container guided vertically adjustably on a frame in the manner of a parallel linkage, said weighing container being supported relative to a frame by way of a weighing cell assembly having a weighing cell articulated in the vertical direction between the frame and the weighing container. In order to provide advantageous design conditions, it is proposed that the weighing container is mounted on the frame in the manner of a parallel linkage via leaf springs clamped at both ends.

1 Claim, 2 Drawing Sheets

(56) References Cited

U.S. PATENT DOCUMENTS

| | | | |
|---|---|---|---|
| 4,403,191 A | | 9/1983 | Satake |
| 4,465,211 A | * | 8/1984 | van der Lely .......... A01C 7/102 |
| | | | 177/112 |
| 5,173,079 A | | 12/1992 | Gerrish |
| 5,262,598 A | * | 11/1993 | Stotler ................... G01G 13/06 |
| | | | 177/116 |
| 5,487,702 A | | 1/1996 | Campbell et al. |
| 5,591,943 A | * | 1/1997 | Cheng ....................... B66C 1/40 |
| | | | 177/147 |
| 6,313,414 B1 | | 11/2001 | Campbell |
| 7,022,921 B2 | * | 4/2006 | Petrotto ................ G01G 19/44 |
| | | | 177/144 |

\* cited by examiner

WEIGHING DEVICE FOR A PLOT COMBINE HARVESTER

CROSS REFERENCE TO RELATED APPLICATIONS

This application is the National Stage of PCT/AT2014/050039 filed on Feb. 11, 2014, which claims priority under 35 U.S.C. §119 of Austrian Application No. A 50187/2013 filed on Mar. 18, 2013, the disclosure of which is incorporated by reference. The international application under PCT article 21(2) was not published in English.

FIELD OF THE INVENTION

The invention relates to a weighing device for a plot combine harvester, comprising a weighing container guided vertically adjustably on a frame in the manner of a parallel linkage, said weighing container being supported relative to a frame by way of a weighing cell assembly having a weighing cell articulated in the vertical direction between the frame and the weighing container.

DESCRIPTION OF THE PRIOR ART

In order to avoid disadvantages of weighing devices for detecting the harvesting weight with weighing containers, which are suspended in a freely oscillating manner on the plot combine harvesters for adjustment to sloping sites, it was already proposed (U.S. Pat. No. 5,487,702 A, U.S. Pat. No. 6,313,414 B1) to support the weighing container via a weighing cell assembly on a frame which is rigidly connected to the plot combine harvester. In order to enable influences by oscillation and inclination to be considered in the result of the weighing, a reference weight with an additional weighing cell is used, so that the difference between the known quantity of the reference weight and the measurement quantity detected by means of the weighing cell can be used as a corrective measure for the weight of the harvested material situated in the weighing container, which weight was detected via the weighing cell assembly. The additional expense required by the additional reference weight and the weighing cell required for this purpose is disadvantageous for such known weighing devices. In addition, there is a likelihood that the measuring errors of the individual weighing cells of the weighing cell assembly will accumulate. It is a further disadvantage that as a result of the support of the weighing container via several weighing cells of the weighing cell assembly there is a likelihood that the weighing cells may brace against each other, which leads to measuring errors. If elastically resilient elements are used for the avoidance of such mutual bracing, the oscillation tendency of the weighing container will increase, which is to be avoided.

For the purpose of avoiding these disadvantages it is already known to provide a weighing container with a weighing cell assembly which is supported in the manner of a parallel linkage supported relative to a frame, said weighing cell assembly comprising a weighing cell which is loaded in the vertical direction, so that a single weighing cell is sufficient for detecting the weight. The limitation to one single weighing cell avoids all the difficulties which would need to be considered in the case of weighing assemblies consisting of several weighing cells. Parallel linkages with rotatably mounted guide rods require maintenance in order to ensure constant frictional conditions in the joints even over prolonged periods of time.

SUMMARY OF THE INVENTION

The invention is thus based on the object of forming a weighing device for a plot combine harvester in such a way that advantageous preconditions for a precise detection of the harvesting weight can be provided in combination with limited space requirements, which shall be substantially independent of constructional tolerances and maintenance work.

On the basis of a weighing device of the kind mentioned above, this object is achieved by the invention in such a way that the weighing container is mounted on the frame in the manner of a parallel linkage via leaf springs clamped at both ends.

The use of guide rods can be avoided by using leaf springs which are clamped in the manner of a parallel linkage on both sides, so that all disadvantages are avoided which arise in connection with the rotational joints of parallel linkages. The leaf springs also offer play-free lateral guidance for the weighing container. The spring deflection required for loading the weighing cell can substantially be disregarded, so that influences of the changing spring forces due to the displacement of the weighing container have no influence on the results of the measurement.

Acceleration sensors and inclination sensors can additionally be used in the known manner for taking sloping sites and oscillations into account.

The weighing cell linked in the vertical direction between the frame and the weighing container can be subjected to pressure or tensile loading via the weighing container depending on the linkage. Especially simple constructional conditions are obtained if the weighing cell is subjected to tensile loading because the weighing cell, under tensile loading, can be connected in a simpler way to the frame and the container in a manner free from torque. For this purpose, the weighing cell merely needs to be linked on all sides in a pivotable manner between the frame and the container. Linkage via a universal joint or a ball-and-socket joint fulfils this requirement in a simple way.

In order to provide advantageous constructional conditions, an auxiliary frame in the manner of a parallel linkage which accommodates the weighing container can be mounted on the frame, wherein the weighing cell acts on the auxiliary frame. As a result of this measure, the weighing container can be arranged in a relatively light way irrespective of the bearing and guide conditions because the bearing and guide forces are absorbed by the auxiliary frame.

BRIEF DESCRIPTION OF THE DRAWINGS

The subject matter of the invention is shown by way of example in the drawings, wherein.

DESCRIPTION OF THE PREFERRED EMBODIMENT

Figure 1:
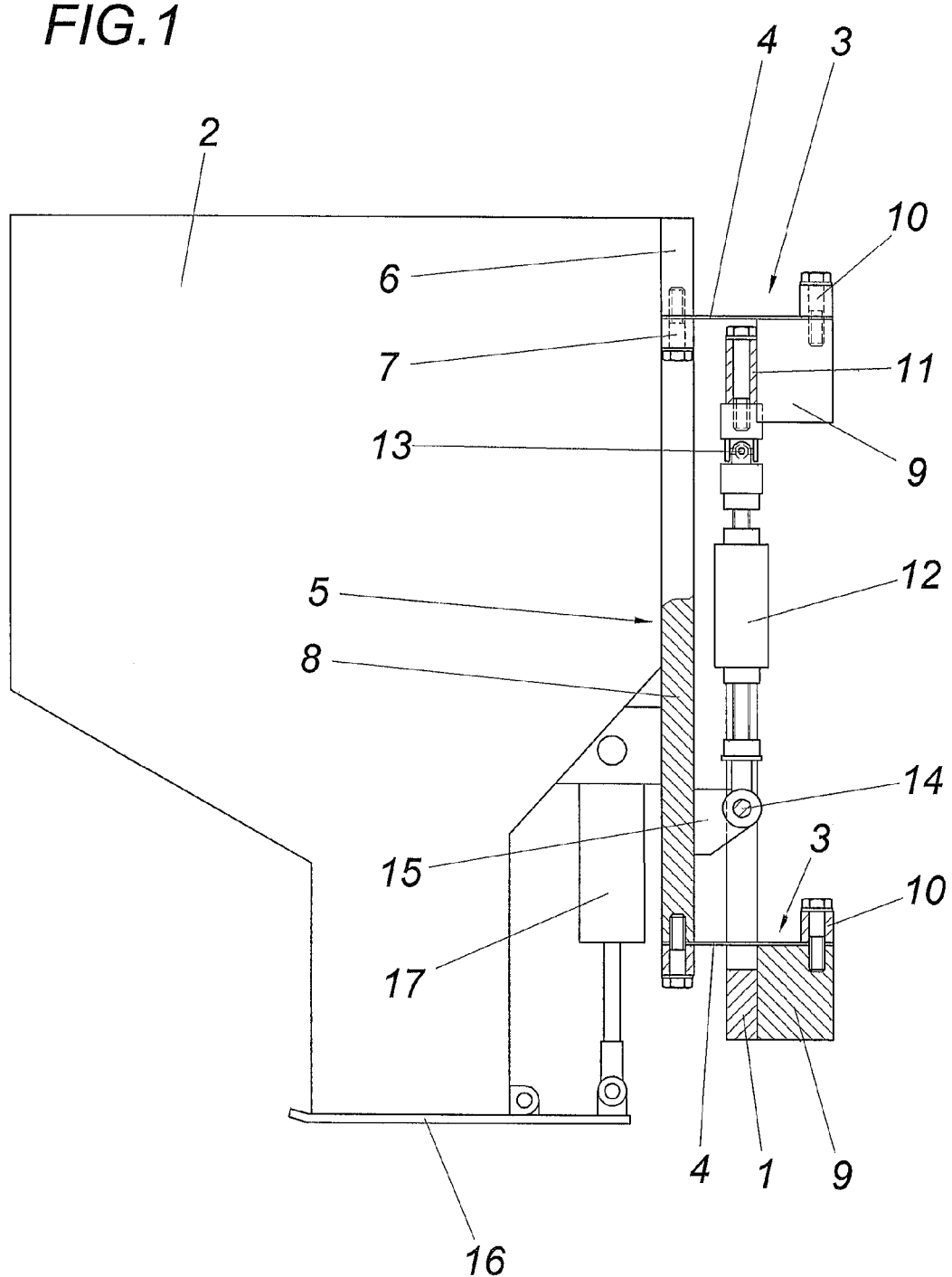
FIG. 1 shows a weighing device in accordance with the invention for a plot combine harvester in a simplified, partly elevated lateral view.
Figure 2:
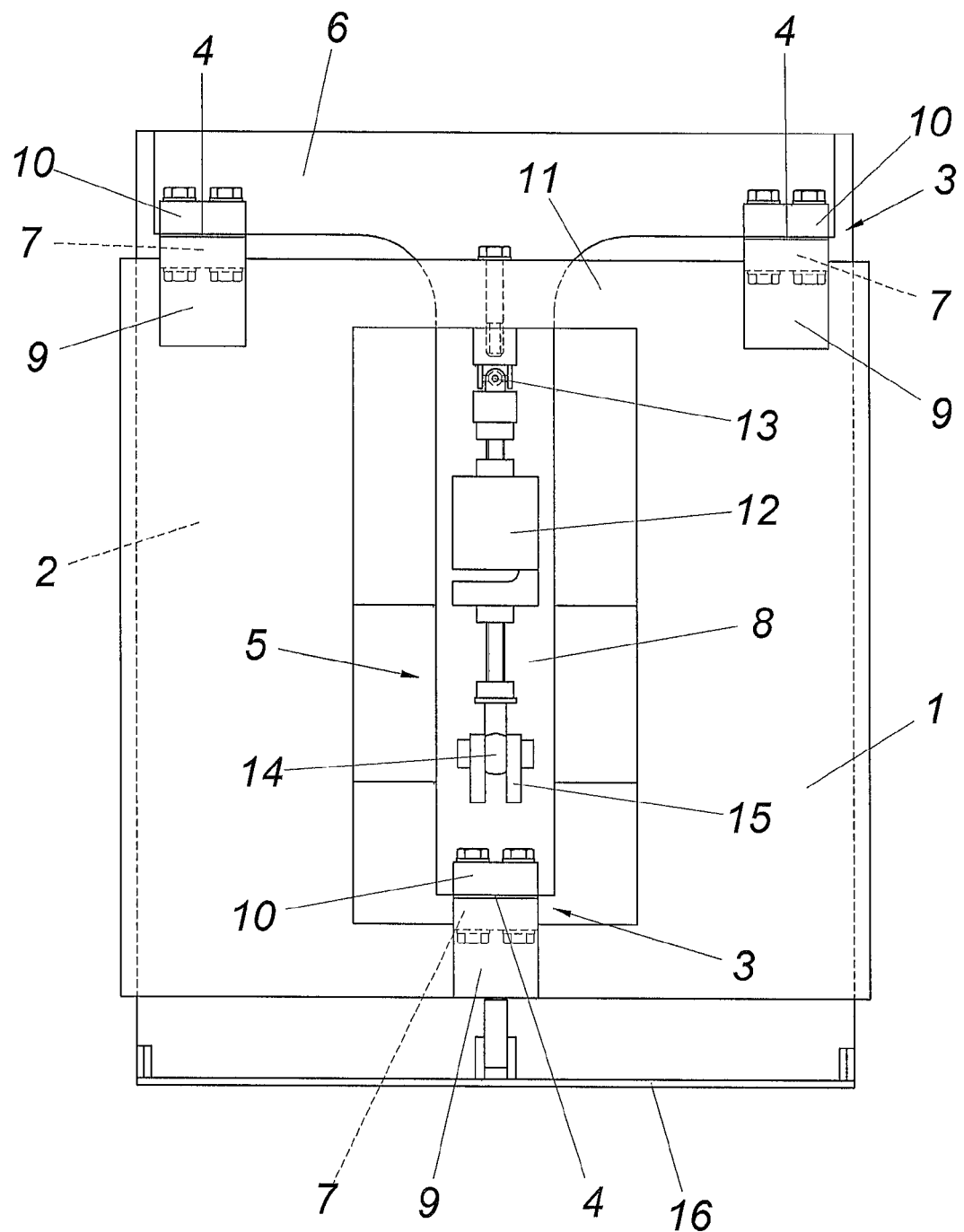
FIG. 2 shows said weighing device in a rear view from the frame side.

The illustrated weighing device comprises a frame 1 in form of a vertical frame which can be mounted rigidly on a plot combine harvester, and a weighing container 2 which is displaceably guided on the frame 1 in the manner of a parallel linkage 3 in the vertical direction. Said parallel linkage 3 is formed by leaf springs 4 which are clamped on both sides and connect the frame 1 to an auxiliary frame 5 which accommodates the weighing container 2. The auxiliary frame 5 is formed in the manner of a T-shaped support, wherein two leaf springs 4 are clamped to the ends of the transverse leg 6 by means of clamping chocks 7 and a middle leaf spring 4 to the face end of the web 8 of the T-shaped auxiliary frame 5 also by means of a clamping chock 7. The clamping of said leaf springs 4 in the region of the frame 1 occurs similarly via support bodies 9 connected to the frame 1, on which the leaf springs 4 are retained by pressing via clamping chocks 10. A weighing cell 12 is suspended via a universal joint 13 on the upper leg 11 of the rack-like frame 1. On the opposite side, the weighing cell 11 acts via a ball joint 14 on a support lug 15 of the auxiliary frame 5, as is shown especially in FIG. 1. The auxiliary frame 5, which is displaceably guided via leaf springs 4 clamped on both sides in the manner of a parallel linkage 3 in relation to the frame 1 in the vertical direction, is thus suspended via the weighing cell 12 on the frame 1, so that only vertical forces can be absorbed by the weighing cell 12 and transverse forces have no influence on the result of the measurement.

The harvested material to be weighed is filled in batches into the weighing container 2 and is weighed by means of the weighing cell 12. The weighed harvested material can be discharged to a collecting container via a hinged bottom 16 which can be actuated by a swing cylinder 17.

The invention claimed is:

1. A weighing device for a plot combine harvester, comprising a weighing container (2) guided vertically adjustably on a frame (1) in the manner of a parallel linkage (3), said weighing container being supported relative to a frame (1) by way of a weighing cell assembly having a weighing cell (12) articulated in the vertical direction between the frame (1) and the weighing container (2), wherein the weighing container (2) is mounted on the frame (1) in the manner of a parallel linkage (3) via leaf springs (4) clamped at both ends, and wherein the weighing cell (12) is pivotably articulated on all sides between the frame (1) and the weighing container (2).

* * * * *